(12) United States Patent
Otsubo et al.

(10) Patent No.: US 10,848,018 B2
(45) Date of Patent: Nov. 24, 2020

(54) STATOR, MOTOR AND PUMP DEVICE

(71) Applicant: NIDEC SANKYO CORPORATION, Nagano (JP)

(72) Inventors: Keishi Otsubo, Nagano (JP); Shinichi Utsumi, Nagano (JP); Yuji Maruyama, Nagano (JP); Hideo Shimodaira, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 331 days.

(21) Appl. No.: 15/761,430

(22) PCT Filed: Sep. 28, 2016

(86) PCT No.: PCT/JP2016/078584
§ 371 (c)(1),
(2) Date: Mar. 20, 2018

(87) PCT Pub. No.: WO2017/057438
PCT Pub. Date: Apr. 6, 2017

(65) Prior Publication Data
US 2019/0052130 A1 Feb. 14, 2019

(30) Foreign Application Priority Data

Sep. 30, 2015 (JP) .................. 2015-193972

(51) Int. Cl.
*H02K 1/14* (2006.01)
*F04D 13/06* (2006.01)
(Continued)

(52) U.S. Cl.
CPC ............. *H02K 1/148* (2013.01); *F04D 13/06* (2013.01); *H02K 1/185* (2013.01); *H02K 29/03* (2013.01)

(58) Field of Classification Search
CPC ............. H02K 1/14; H02K 1/18; H02K 1/185; H02K 1/148; H02K 29/03; F04D 13/06
See application file for complete search history.

(56) References Cited

U.S. PATENT DOCUMENTS 7,382,075 B2 6/2008 Wang et al.
2007/0018521 A1* 1/2007 Ishiguro ............... F04D 29/043
310/156.43
(Continued)

FOREIGN PATENT DOCUMENTS

DE 102012025049 6/2014
JP 2004-274914 9/2004
(Continued)

OTHER PUBLICATIONS

"Search Report of Europe Counterpart Application", dated Oct. 9, 2018, p. 1-p. 9.
(Continued)

*Primary Examiner* — Naishadh N Desai
(74) *Attorney, Agent, or Firm* — JCIPRNET

(57) ABSTRACT

A stator is provided. In this stator, a stator core comprises: an outer peripheral ring part formed in a ring shape; and multiple salient pole parts protruded from the outer peripheral ring part to an inner side in a radial direction of the stator. The outer peripheral ring part comprises outer peripheral parts in a same number as multiple salient pole parts. When an outer side face of the outer peripheral part in the radial direction is an outer peripheral face, both end side portions in the circumferential direction of the outer peripheral face of one of the outer peripheral parts are respectively formed to be a curved face part in a convex curved face shape which is a circular arc shape, curvature radii of the
(Continued)

circular arc shapes are equal to each other and their curvature centers are common when viewed in an axial direction of the stator.

19 Claims, 8 Drawing Sheets

(51) Int. Cl.
*H02K 1/18* (2006.01)
*H02K 29/03* (2006.01)

(56) References Cited

U.S. PATENT DOCUMENTS

| | | | |
|---|---|---|---|
| 2007/0237660 A1* | 10/2007 | Akiyoshi | F04D 29/628 417/423.11 |
| 2009/0284096 A1 | 11/2009 | Katagiri et al. | |
| 2015/0159656 A1* | 6/2015 | Urabe | F04D 29/2227 165/104.31 |

FOREIGN PATENT DOCUMENTS

| | | |
|---|---|---|
| JP | 2009-136101 | 6/2009 |
| JP | 2010-057211 | 3/2010 |

OTHER PUBLICATIONS

"International Search Report (Form PCT/ISA/210) of PCT/JP2016/078584", dated Dec. 6, 2016, with English translation thereof, pp. 1-2.

* cited by examiner

US 10,848,018 B2

STATOR, MOTOR AND PUMP DEVICE

CROSS-REFERENCE TO RELATED APPLICATION

This application is a 371 application of the international PCT application serial no. PCT/JP2016/078584, filed on Sep. 28, 2016, which claims the priority benefit of Japan application no. 2015-193972, filed on Sep. 30, 2015. The entirety of each of the abovementioned patent applications is hereby incorporated by reference herein and made a part of this specification.

TECHNICAL FIELD

The present invention relates to a stator which is used in a motor or the like. Further, the present invention relates to a motor comprising the stator and relates to a pump device comprising the motor.

BACKGROUND ART

Conventionally, a motor which includes a rotor and a cylindrical tube-shaped stator disposed on an outer peripheral side with respect to the rotor has been known (see, for example, Patent Literature 1). In the motor described in Patent Literature 1, a stator includes a stator core and drive coils wound around teeth parts of the stator core through insulators. The stator core is formed by combining a plurality of split cores which are divided in a circumferential direction of the stator. The split core is provided with an outer yoke part connected with an outer side end of a teeth part in a radial direction of the stator. Further, Patent Literature 1 describes that the stator core may utilize a so-called curling core which is formed by bending a belt-shaped core whose outer yoke parts are integrally connected with each other in a circular ring shape and by connecting both end parts of the belt-shaped core with each other.

A curling core is, for example, as shown in FIG. 8A, formed by using an original core body 105 provided with a belt-shaped portion 103 in a straight line shape, which is structured of a plurality of outer yoke parts 102 connected with each other through connecting parts 101, and teeth parts 104 which are protruded from each of the plurality of the outer yoke parts 102 to a direction perpendicular to a longitudinal direction of the belt-shaped portion 103. Further, the curling core is, for example, as shown in FIG. 8B, formed by bending the belt-shaped portion 103 at the connecting parts 101 so that the belt-shaped portion 103 becomes a circular ring shape and the teeth parts 104 are protruded to an inner side in a radial direction and by connecting both ends of the belt-shaped portion 103 with each other. In this case, the original core body 105 is commonly a laminated core which is formed by laminating a plurality of thin magnetic plates and, the original core body 105 is formed so that core plates in a thin plate shape having the same shape as the original core body 105 when viewed in a thickness direction are laminated and fixed to each other.

CITATION LIST

Patent Literature

PATENT LITERATURE 1: Japanese Patent Laid-Open No. 2010-57211

SUMMARY

Technical Problem

In order to reduce a cost of the motor described in Patent Literature 1, it is preferable to reduce a manufacturing cost of the stator core. Therefore, an objective of the present invention is to provide a stator having a stator core, which is a curling core, the stator being capable of reducing a manufacturing cost of the stator core. Further, an objective of the present invention is to provide a motor comprising the stator. In addition, an objective of the present invention is to provide a pump device comprising the motor.

Solution to Problem

To achieve the above mentioned objective, the present invention provides a stator formed in a tube shape which includes a coil, an insulation member, and a stator core having salient pole parts, the coil being wound around each of the salient pole parts through the insulation member. The stator core is provided with an outer peripheral ring part which is formed in a ring shape, and the salient pole parts which are protruded from the outer peripheral ring part to an inner side in a radial direction of the stator and are disposed at regular intervals in a circumferential direction of the stator. The outer peripheral ring part is structured of the same number of outer peripheral parts as the salient pole parts, each of the outer peripheral parts is connected with one salient pole part. Further, when an outer side face of the outer peripheral part in the radial direction is referred to as an outer peripheral face, both end side portions in the circumferential direction of the outer peripheral face of one of the outer peripheral parts are respectively formed to be a curved face part in a convex curved face shape which is a circular arc shape, and curvature radii of the circular arc shapes are equal to each other and their curvature centers are common when viewed in an axial direction of the stator. An outer diameter of a portion between the two curved face parts in the circumferential direction of the outer peripheral face of the one of the outer peripheral parts is set to be smaller than an outer diameter of the curved face part.

In the stator in the present invention, both end side portions in the circumferential direction of the outer peripheral face of one of the outer peripheral parts which structures a part of the outer peripheral ring part are respectively formed to be a curved face part in a convex curved face shape which is a circular arc shape, and the curvature radii of the circular arc shapes are equal to each other and their curvature centers are common when viewed in an axial direction of the stator. Further, an outer diameter of a portion between the two curved face parts in the circumferential direction of the outer peripheral face of the one of the outer peripheral parts is set to be smaller than an outer diameter of the curved face part. Therefore, according to the present invention, for example, when original core bodies like the original core body 105 shown in FIG. 8A (alternatively, core plates in a thin plate shape structuring an original core body) are to be formed from one plate-shaped member, many original core bodies (or core plates) can be formed from one piece of material member in comparison with a case that the entire outer peripheral face of one outer peripheral part is formed in one curved face shape.

In other words, in the present invention, an outer diameter of a portion between the two curved face parts in the circumferential direction of the outer peripheral face of the one outer peripheral part is set to be smaller than an outer diameter of the curved face part. Therefore, in comparison with a case that the entire outer peripheral face of one outer peripheral part is formed in one curved face shape whose curvature radius is equal to that of the curved face part, when original core bodies (or core plates) are to be formed from one material member, the original core bodies (or core plates) can be formed even when a distance between the belt-shaped portions corresponding to the belt-shaped portion 103 is made smaller. As a result, many original core bodies (or core plates) can be formed from one material member. In other words, in the present invention, the number of original core bodies (or core plates) which are obtained from one material member can be increased. Therefore, according to the present invention, in a stator having a stator core which is a curling core, a manufacturing cost of a stator core can be reduced.

In the present invention, it is preferable that, when viewed in the axial direction, the curvature center of the curved face part is coincided with an axial center of the stator. In other words, it is preferable that a part of an outer peripheral face of an outer peripheral ring part formed in a ring shape is formed to be a curved face part in a convex curved face shape which is a circular arc shape with an axial center of the stator as a curvature center. According to this structure, while reducing an outer diameter of the stator core, a cross-sectional area of the outer peripheral ring part can be secured. Therefore, while reducing an outer diameter of the stator core, magnetic saturation in the outer peripheral ring part can be suppressed.

In the present invention, it is preferable that the outer peripheral face of the one of the outer peripheral parts is formed with a second curved face part in a convex curved face shape which is a circular arc shape when viewed in the axial direction between the two curved face parts in the circumferential direction. According to this structure, in comparison with a case that the two curved face parts are connected with each other through a flat face part in a flat face shape, a cross-sectional area of the outer peripheral ring part can be secured. Therefore, magnetic saturation in the outer peripheral ring part can be effectively suppressed.

In the present invention, for example, the outer peripheral face of the one of the outer peripheral parts is formed with a flat face part in a flat face shape which is a straight line shape when viewed in the axial direction between the curved face part and the second curved face part in the circumferential direction.

In the present invention, it is preferable that the second curved face part is formed with a recessed part which is recessed to an inner side in the radial direction, the recessed part is formed over an entire region in the axial direction of the second curved face part and is formed in a circular arc shape when viewed in the axial direction, and the salient pole part and the recessed part are disposed so as to overlap in the radial direction. According to this structure, for example, when an original core body like the original core body 105 shown in FIG. 8A is to be bent to form a stator core, the original core body can be bent by pressing a bending jig against the recessed part. Therefore, a stator in an appropriate shape can be formed by using a bending jig.

In the present invention, it is preferable that the outer peripheral face of the one of the outer peripheral parts is formed between the curved face part and the second curved face part in the circumferential direction with a first flat face part in a flat face shape which is a straight line shape when viewed in the axial direction and is connected with the curved face part, and a second flat face part in a flat face shape which is a straight line shape when viewed in the axial direction and is connected with the first flat face part and the second curved face part.

In the present invention, it is preferable that a boundary portion of the outer peripheral parts adjacent to each other in the circumferential direction is formed with a protruded part protruding to an inner side in the radial direction in an inner peripheral face of the outer peripheral ring part. According to this structure, a cross-sectional area of the outer peripheral ring part in a boundary portion of the outer peripheral parts which are adjacent to each other in the circumferential direction is secured by the protruded part and thus magnetic saturation in the boundary portion can be suppressed effectively.

In the present invention, it is preferable that an outer diameter of a portion between the two curved face parts in the circumferential direction of the outer peripheral face of the one of the outer peripheral parts is longer in the circumferential direction than a length obtained by adding the two curved face parts in the circumferential direction.

In the present invention, it is preferable that a curvature center of the second curved face part is coincided with a curvature center of the curved face part, and a curvature radius of the second curved face part is set to be smaller than a curvature radius of the curved face part.

The stator in the present invention may be used in a motor including a rotor having a drive magnet and is disposed on an inner peripheral side with respect to the stator. Further, the motor may be used in a pump device which includes an impeller attached to the rotor, a pump chamber in which the impeller and the rotor are disposed and through which a fluid is passed, a partition member which is disposed between the stator and the pump chamber and which prevents an inflow of the fluid in the pump chamber into an arrangement portion of the stator, and a resin sealing member made of resin which covers the stator. In the motor and the pump device, a manufacturing cost of the stator core can be reduced.

Effects of the Invention

As described above, in the present invention, in the stator having the stator core which is a curling core, a manufacturing cost of the stator core can be reduced. Further, in the motor and the pump device, a manufacturing cost of the stator core can be reduced.

DESCRIPTION OF EMBODIMENTS

An embodiment of the present invention will be described below with reference to the accompanying drawings.

(Schematic Structure of Pump Device)

Figure 1:
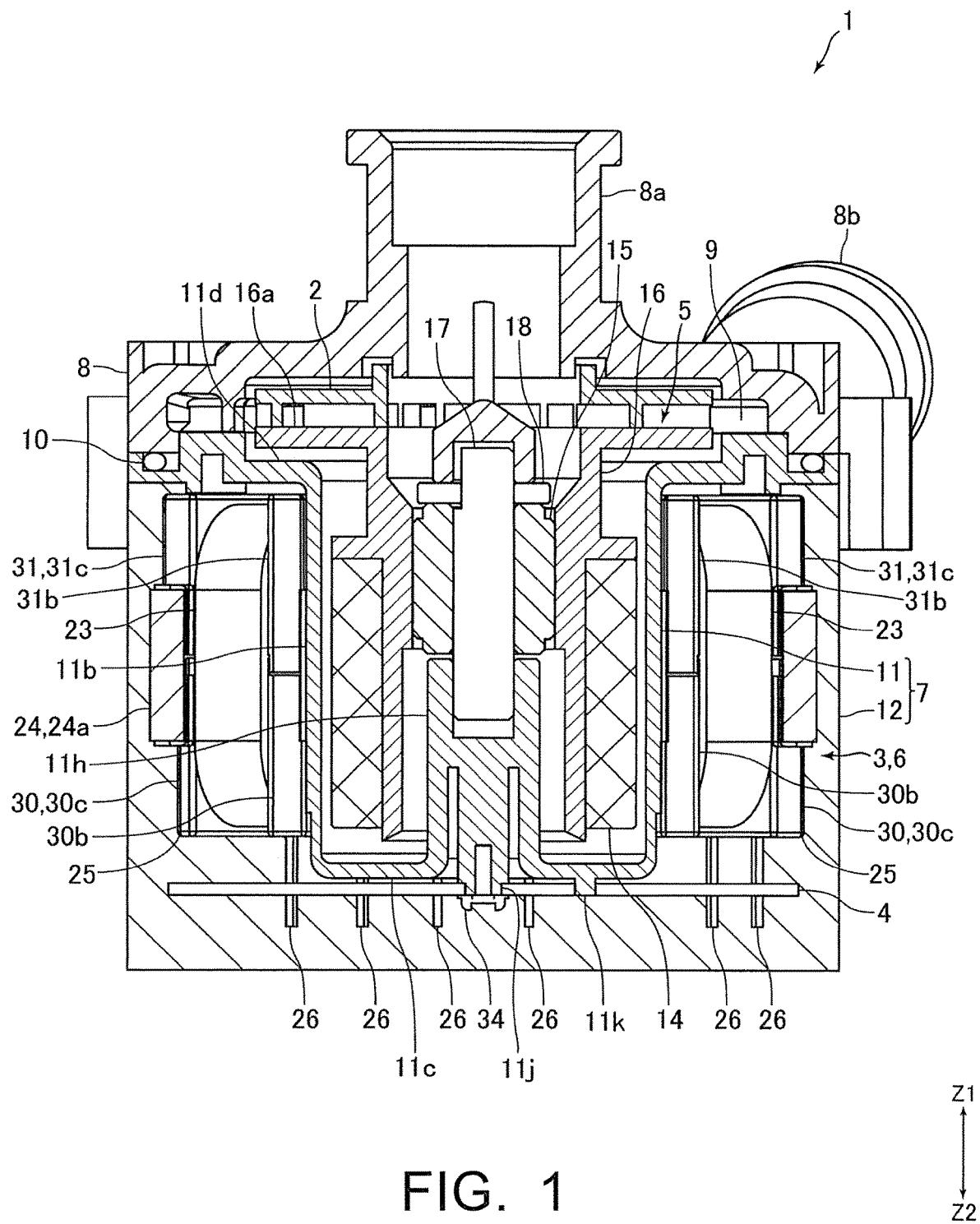
FIG. 1 is a cross-sectional view showing a pump device in accordance with an embodiment of the present invention.

FIG. 1 is a cross-sectional view showing a pump device 1 in accordance with an embodiment of the present invention. In the following descriptions, an upper side in FIG. 1 ("Z1" direction side) is referred to as an "upper" side and a lower side in FIG. 1 ("Z2" direction side) is referred to as a "lower" side.

A pump device 1 in this embodiment is a pump referred to as a canned pump (canned motor pump), which includes an impeller 2, a motor 3 structured to rotate the impeller 2, and a circuit board 4 configured to control the motor 3. The motor 3 is structured of a rotor 5 and a stator 6. The impeller 2, the motor 3 and the circuit board 4 are disposed inside a case body structured of a housing 7 and an upper case 8 which covers an upper part of the housing 7. The housing 7 and the upper case 8 are fixed to each other with a screw not shown.

The upper case 8 is formed with an intake part 8a for a fluid and an ejection part 8b for the fluid. A pump chamber 9 where a fluid inhaled through the intake part 8a is passed toward the ejection part 8b is formed between the housing 7 and the upper case 8. Further, a sealing member (O-ring) 10 is disposed in a joined portion between the housing 7 and the upper case 8 for securing airtightness of the pump chamber 9. The housing 7 includes a partition member 11 which is disposed between the pump chamber 9 and the stator 6 so as to separate the pump chamber 9 from the stator 6, and a resin sealing member 12 made of resin which covers an under face and a side face of the partition member 11.

The rotor 5 includes a drive magnet 14, a sleeve 15 in a cylindrical tube shape, and a holding member 16 which holds the drive magnet 14 and the sleeve 15. The holding member 16 is formed in a substantially cylindrical tube shape with a flange. The drive magnet 14 is fixed on an outer peripheral side of the holding member 16 and the sleeve 15 is fixed on an inner peripheral side of the holding member 16. An impeller 2 is fixed to a flange part 16a disposed on an upper side of the holding member 16. The impeller 2 and the rotor 5 are disposed inside the pump chamber 9.

The rotor 5 is rotatably supported by a fixed shaft 17. The fixed shaft 17 is disposed so that an axial direction of the fixed shaft 17 and the upper and lower direction are coincided with each other. In other words, the upper and lower direction is an axial direction of the rotor 5. An upper end of the fixed shaft 17 is held by the upper case 8 and a lower end of the fixed shaft 17 is held by the housing 7. The fixed shaft 17 is inserted through an inner peripheral side of the sleeve 15. Further, the fixed shaft 17 is attached with a thrust bearing member 18 which is abutted with an upper end face of the sleeve 15. In this embodiment, the sleeve 15 functions as a radial bearing for the rotor 5, and the sleeve 15 and the thrust bearing member 18 function as a thrust bearing for the rotor 5.

The stator 6 includes drive coils 23 as a coil, a stator core 24, and insulators 25 as an insulation member, and the stator 6 is formed in a tube shape as a whole. Specifically, the stator 6 is formed in a substantially cylindrical tube shape. The stator 6 is disposed on an outer peripheral side of the rotor 5 through the partition member 11. In other words, the rotor 5 is disposed on an inner peripheral side with respect to the stator 6. Further, the stator 6 is disposed so that an axial direction of the stator 6 and the upper and lower direction are coincided with each other. In other words, the upper and lower direction is an axial direction of the stator 6. Further, the stator 6 includes terminal pins 26 around which end parts of the drive coils 23 are bound and electrically connected. A specific structure of the stator 6 will be described below. In the following descriptions, a radial direction of the rotor 5 and the stator 6 is referred to as a "radial direction", and a circumferential direction of the rotor 5 and the stator 6 is referred to as a "circumferential direction".

The partition member 11 is formed in a substantially bottomed cylindrical tube shape with a flange and is provided with a cylindrical tube part 11b, a bottom part 11c and a flange part 11d. The cylindrical tube part 11b is formed in a cylindrical tube shape and is disposed so as to cover an outer peripheral face of the drive magnet 14. Further, the cylindrical tube part 11b is disposed so that an axial direction of the cylindrical tube part 11b and the upper and lower direction are substantially coincided with each other. The bottom part 11c is formed in a substantially circular plate shape which closes a lower end of the cylindrical tube part 11b. The flange part 11d is formed so as to be enlarged from an upper end of the cylindrical tube part 11b to an outer side in the radial direction.

An upper face of the bottom part 11c is formed with a shaft holding part 11h which holds a lower end side of the fixed shaft 17 so as to protrude to an upper side. An under face of the bottom part 11c is formed with a fixing projection 11j for fixing a circuit board 4 to the partition member 11 and a positioning projection 11k for positioning the circuit board 4 so as to protrude to a lower side. As shown in FIG. 1, an inner side and an upper side of the partition member 11 is structured to be the pump chamber 9, and the impeller 2 and the rotor 5 are disposed on the inner side and the upper side of the partition member 11. The partition member 11 functions to prevent the fluid inside the pump chamber 9 from flowing into an arrangement portion of the stator 6.

The circuit board 4 is fixed to an under face side of the bottom part 11c so that a thickness direction of the circuit board 4 and the upper and lower direction are coincided with each other. Specifically, the circuit board 4 is fixed to the under face side of the bottom part 11c by a screw 34 screwed into the fixing projection 11j in a state positioned by the fixing projection 11j and the positioning projection 11k. Further, the lower end side portions of the terminal pins 26 are fixed to the circuit board 4 by soldering.

The resin sealing member 12 completely covers the circuit board 4, the drive coils 23 and the like to protect the circuit board 4, the drive coils 23 and the like from a fluid. The resin sealing member 12 is formed by injecting resin material to the partition member 11 in a state that the circuit board 4 and the stator 6 are attached to the partition member 11. Specifically, the partition member 11 to which the circuit board 4 and the stator 6 have been attached is disposed inside a die and resin material is injected in the die and cured to form the resin sealing member 12. The resin sealing member 12 is formed in a substantially bottomed cylindrical tube shape as a whole and completely covers the circuit board 4, the stator 6, the cylindrical tube part 11b and the bottom part 11c. Further, the resin sealing member 12 covers an under face of the flange part 11d.

(Structure of Stator)

Figure 2:
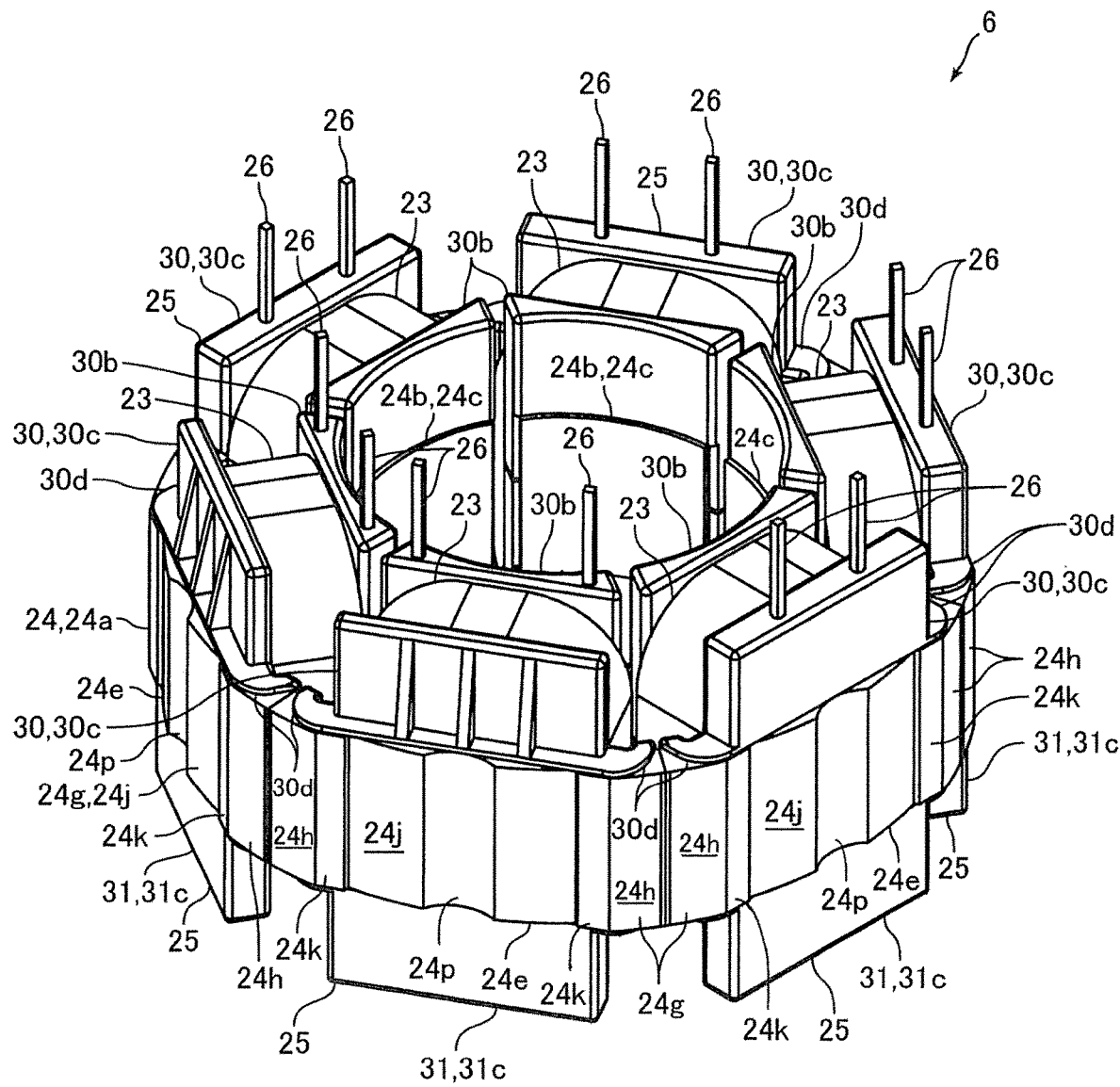
FIG. 2 is a perspective view showing a stator in FIG. 1.
Figure 3:
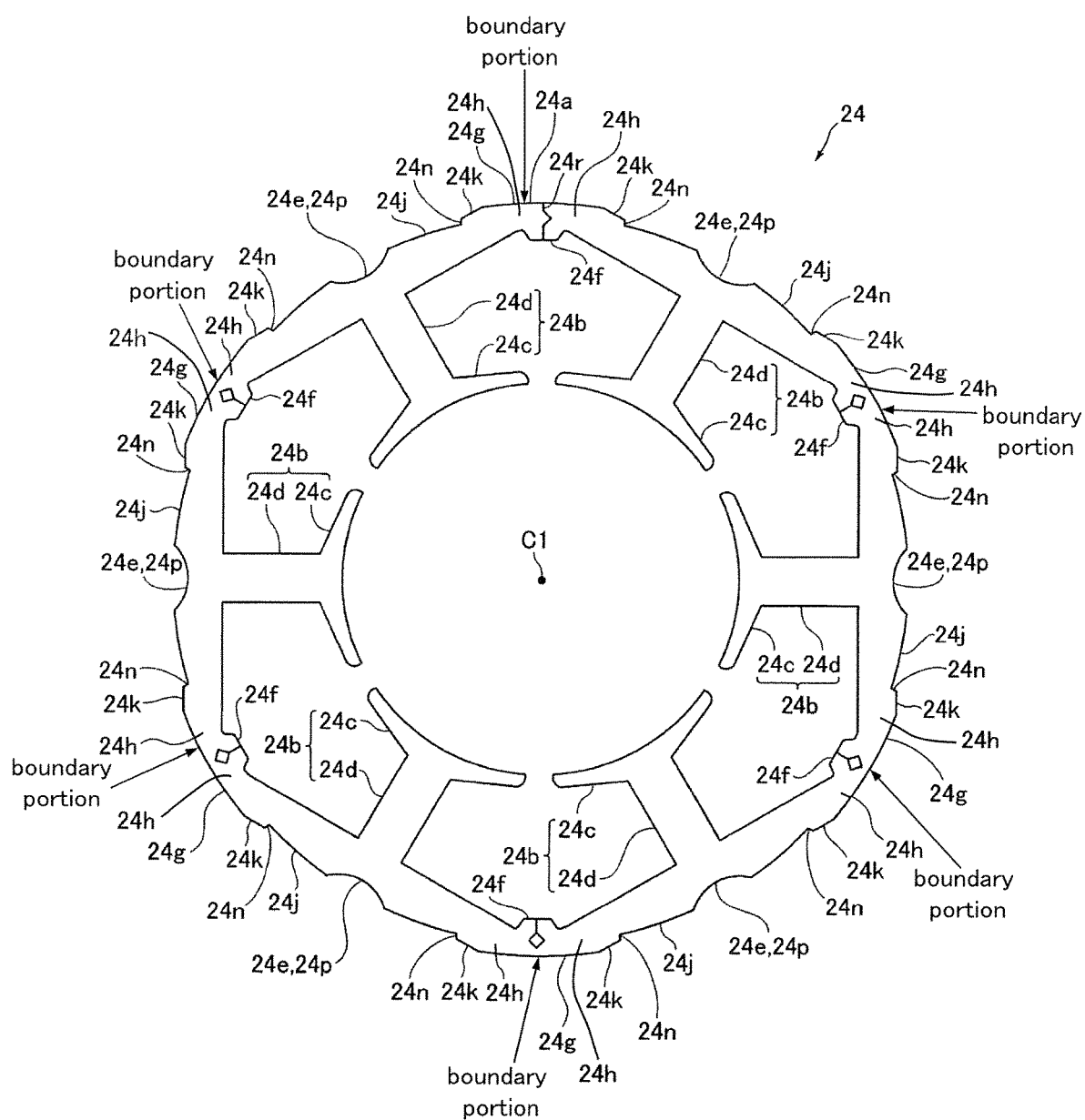
FIG. 3 is a plan view showing a stator core in FIG. 2.
Figure 4:
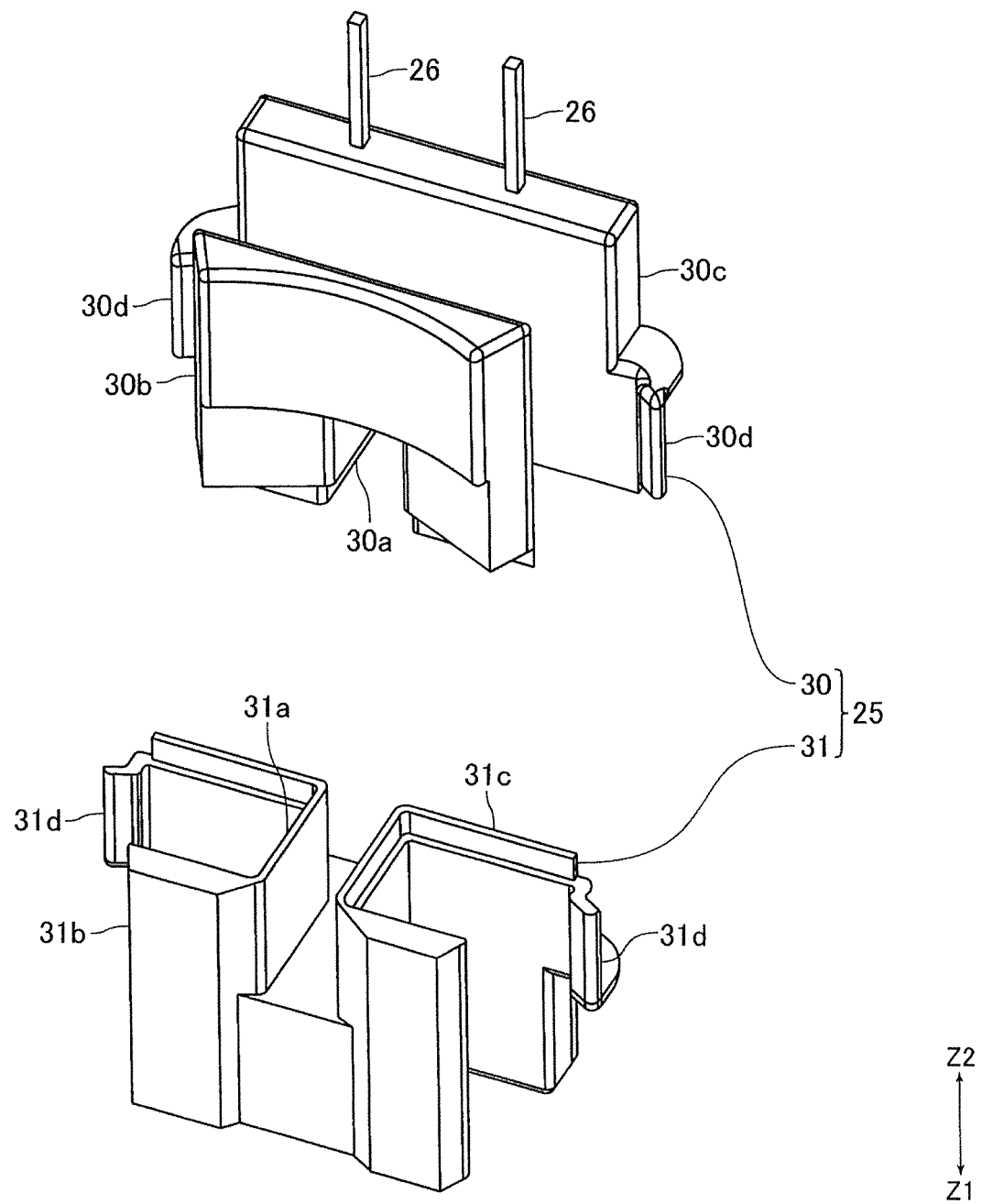
FIG. 4 is an exploded perspective view showing an insulator in FIG. 2.
Figure 5A:
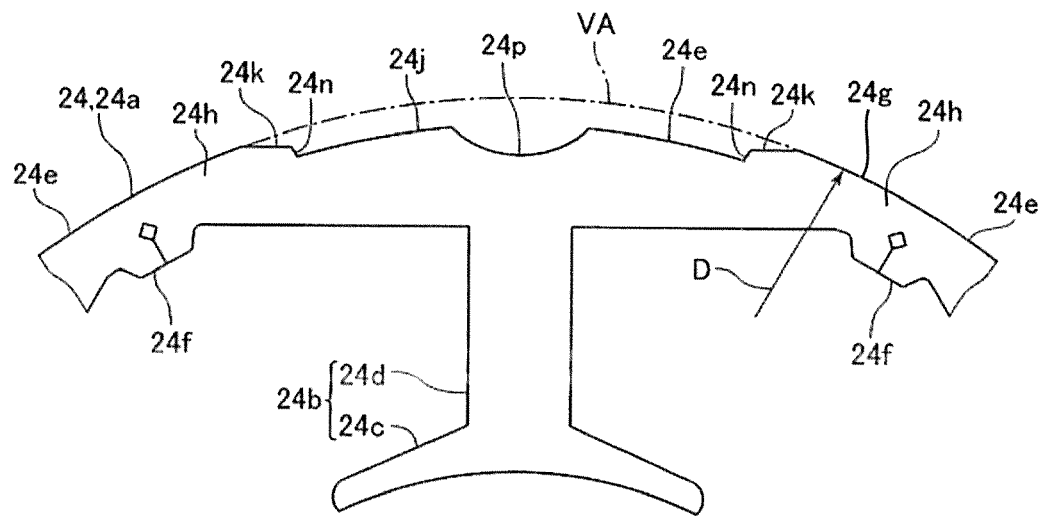
FIG. 5A and FIG. 5B are enlarged views showing a part of a stator core shown in FIG. 3.
Figure 5B:
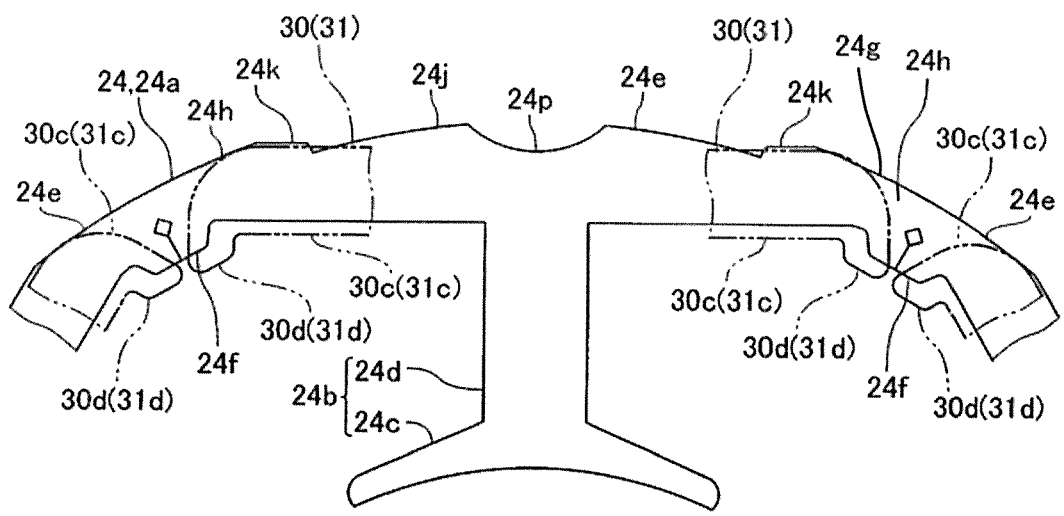

FIG. 2 is a perspective view showing the stator 6 in FIG. 1. FIG. 3 is a plan view showing the stator core 24 in FIG. 2. FIG. 4 is an exploded perspective view showing the insulator 25 in FIG. 2. FIG. 5A and FIG. 5B are enlarged views showing a part of the stator core 24 shown in FIG. 3.

The stator 6 includes, as described above, the drive coils 23, the stator core 24, the insulators 25 and the terminal pins 26. The stator core 24 is a laminated core which is structured by laminating thin magnetic plates made of magnetic material. The stator core 24 is, as shown in FIG. 3, provided with an outer peripheral ring part 24a formed in a ring shape and a plurality of salient pole parts 24b which are protruded toward an inner side in the radial direction from the outer peripheral ring part 24a. The stator core 24 in this embodiment is provided with six salient pole parts 24b. The six salient pole parts 24b are formed at equal angular pitches and are disposed at regular intervals in the circumferential direction. In accordance with an embodiment of the present invention, the number of the salient pole parts 24b of the stator core 24 may be other than six.

A shape of an outer peripheral face of the outer peripheral ring part 24a is a substantially circular shape when viewed in the upper and lower direction, and a shape of its inner peripheral face when viewed in the upper and lower direction is formed in a substantially hexagonal ring shape. The outer peripheral face of the outer peripheral ring part 24a structures an outer peripheral face of the stator core 24. An axial center of the outer peripheral ring part 24a when viewed in the upper and lower direction is an axial center of the stator core 24. Further, the axial center of the stator core 24 when viewed in the upper and lower direction is coincided with the axial center of the stator 6.

The outer peripheral ring part 24a is structured of six outer peripheral parts 24e. In other words, the outer peripheral ring part 24a is structured of the same number of the outer peripheral parts 24e as that of the salient pole parts 24b. One outer peripheral part 24e is one portion of the outer peripheral ring part 24a in the circumferential direction, which is a portion between one vertex and its adjacent vertex of the inner peripheral face of the outer peripheral ring part 24a which is formed in a substantially hexagonal shape when viewed in the upper and lower direction. In other words, one outer peripheral part 24e is one portion of the outer peripheral ring part 24a in the circumferential direction, which is a portion corresponding to one side of the inner peripheral face in a substantially hexagonal shape of the outer peripheral ring part 24a when viewed in the upper and lower direction.

The salient pole part 24b is formed at a center of the outer peripheral part 24e in the circumferential direction. In other words, each of the six outer peripheral parts 24e is connected with one salient pole part 24b. Further, the salient pole part 24b is structured of a salient pole tip end part 24c which is a tip end part of the salient pole part 24b and a connecting part 24d which connects the salient pole tip end part 24c with the outer peripheral ring part 24a. When viewed in the upper and lower direction, the salient pole tip end part 24c is formed in a substantially circular arc shape which is extended to both sides in the circumferential direction from a tip end (inner side end in the radial direction) of the connecting part 24d which is formed in a straight line shape. An inner side face of the salient pole tip end part 24c in the radial direction faces an outer peripheral face of the drive magnet 14 through the cylindrical tube part 11b.

As described above, the outer peripheral ring part 24a is formed in a ring shape whose shape of its inner peripheral face when viewed in the upper and lower direction is a substantially hexagonal shape and an inner side face of the outer peripheral part 24e in the radial direction is formed in a flat face perpendicular to the connecting part 24d. A boundary portion of the outer peripheral parts 24e adjacent to each other in the circumferential direction is formed with a protruded part 24f, which is protruded to an inner side in the radial direction, on the inner peripheral face of the outer peripheral ring part 24a. The protruded part 24f is formed so that an cross-sectional area of the outer peripheral ring part 24a at the boundary portion of the outer peripheral parts 24e adjacent to each other in the circumferential direction is secured to prevent magnetic saturation at the boundary portion.

When an outer side face of the outer peripheral part 24e in the radial direction is referred to as an outer peripheral face 24g, each of both end side portions in the circumferential direction of the outer peripheral face 24g is formed to be a curved face part 24h which is a convex curved surface shape. Two curved face parts 24h formed in one outer peripheral face 24g are formed in a circular arc shape so that, when viewed in the upper and lower direction, their curvature radii are equal and their centers of curvature are common. In this embodiment, the center of curvature "C1" (see FIG. 3) of the curved face part 24h when viewed in the upper and lower direction is coincided with an axial center of the stator 6 (in other words, an axial center of the stator core 24). An outer diameter of a portion between the two curved face parts 24h in the circumferential direction of one outer peripheral face 24g is set to be smaller than an outer diameter (diameter) "D" of the curved face part 24h (see FIG. 5A). In other words, as shown in FIG. 5A, when viewed in the upper and lower direction, a portion between the two curved face parts 24h in the circumferential direction of one outer peripheral face 24g is disposed on an inner side in the radial direction with respect to an imaginary circular arc "VA" which is formed by connecting the two curved face parts 24h and whose curvature radius is equal to that of the curved face part 24h. Further, an outer diameter of the portion between the two curved face parts 24h in the circumferential direction of one outer peripheral face 24g is longer in the circumferential direction than a length in the circumferential direction obtained by adding lengths of the two curved face parts 24h.

A portion between the two curved face parts 24h in the circumferential direction of one outer peripheral face 24g is formed with a second curved face part 24j in a convex curved surface shape which is formed in a circular arc shape when viewed in the upper and lower direction, flat face parts 24k as two first flat face parts in a flat face shape which are formed in a straight line shape when viewed in the upper and lower direction, and flat face parts 24n as two second flat face parts in a flat face shape which are formed in a straight line shape when viewed in the upper and lower direction. The second curved face part 24j is formed with a recessed part 24p which is recessed toward an inner side in the radial direction. Each of one ends of the two flat face parts 24n is connected with each of both end sides of the second curved face part 24j. Each of one ends of the two flat face parts 24k is connected with each of the other ends of the two flat face parts 24n, and each of the other ends of the two flat face parts 24k is connected with each of the two curved face parts 24h. In other words, the flat face part 24k and the flat face part 24n are formed between the curved face part 24h and the second curved face part 24j in the circumferential direction of the outer peripheral face 24g.

The recessed part 24p is formed in a circular arc shape when viewed in the upper and lower direction. Further, the recessed part 24p is formed over the entire region of the second curved face part 24j in the upper and lower direction. In addition, the recessed part 24p is formed at a center of the second curved face part 24j in the circumferential direction when viewed in the upper and lower direction. The second curved face part 24j is formed so that, when viewed in the upper and lower direction, a center of the second curved face part 24j and a center of the salient pole part 24b in the circumferential direction are coincided with each other in the circumferential direction. In other words, the second curved face part 24*j* is formed so that a center of the second curved face part 24*j* in the circumferential direction and a center of the salient pole part 24*b* are overlapped with each other in the radial direction when viewed in the upper and lower direction. As described above, the recessed part 24*p* is formed at the center of the second curved face part 24*j* in the circumferential direction when viewed in the upper and lower direction, and thus the recessed part 24*p* and the salient pole part 24*b* are disposed so as to overlap with each other in the radial direction.

The flat face part 24*k* is formed in a flat face shape perpendicular to the connecting part 24*d*. One end of the flat face part 24*k* which is connected with the other end of the flat face part 24*n* is disposed on an outer side in the radial direction with respect to an end part of the second curved face part 24*j*. The flat face parts 24*n* are formed from the respective both ends of the second curved face part 24*j* toward one ends of the flat face parts 24*k* (in other words, toward an outer side in the radial direction). In this embodiment, the curvature center of the second curved face part 24*j* is coincided with the curvature center "C1" of the curved face part 24*h* and a curvature radius of the second curved face part 24*j* is smaller than a curvature radius of the curved face part 24*h*. However, it may be structured that a curvature radius of the second curved face part 24*j* and a curvature radius of the curved face part 24*h* are equal to each other and that a curvature center of the second curved face part 24*j* and a curvature center "C1" of the curved face part 24*h* are separated from each other.

The stator core 24 is a curling core which is structured so that six outer peripheral parts 24*e* connected with each other in a straight line shape (see FIG. 6) are bent at boundaries between the outer peripheral parts 24*e* and that the end parts are connected with each other. In other words, the stator core 24 is formed in a ring shape by connecting end parts of the core with each other which is structured of a belt-shaped core which becomes the outer peripheral ring part 24*a* and six salient pole parts 24*b* extended from one face of the belt-shaped core. Therefore, as shown in FIG. 3, a joint 24*r* is formed at one of positions between the outer peripheral parts 24*e* in the circumferential direction. In this embodiment, the end parts of the belt-shaped core are welded and fixed to each other in the joint 24*r*, and a welded mark is left in the joint 24*r*.

The insulator 25 is formed of insulating material such as resin. The insulator 25 is attached to each of the salient pole parts 24*b* and the stator 6 includes six insulators 25. In other words, the stator 6 includes the same number of the insulators 25 as the salient pole parts 24*b*. Further, the insulator 25 is formed in a tube shape with flanges whose both ends are provided with flange parts and is attached to the salient pole part 24*b* so that an axial direction of the insulator 25 and the radial direction of the stator 6 are coincided with each other. The insulator 25 is structured of a first insulator 30 and a second insulator 31 which are capable of being divided in the upper and lower direction (see FIG. 4), and the first insulator 30 and the second insulator 31 are combined with each other to form the insulator 25. The first insulator 30 is disposed on a lower side and the second insulator 31 is disposed on an upper side.

As shown in FIG. 4, the first insulator 30 is structured of a half tube part 30*a* in a rectangular groove shape, which covers side faces of a lower end side portion of the connecting part 24*d* and an under face of the connecting part 24*d*, an inner side flange part 30*b* which is connected with an inner side end in the radial direction of the half tube part 30*a*, and an outer side flange part 30*c* which is connected with an outer side end in the radial direction of the half tube part 30*a*. The inner side flange part 30*b* is formed in a flange shape which is enlarged from an inner side end of the half tube part 30*a* in the radial direction to both sides in the circumferential direction and to a lower side, and the inner side flange part 30*b* covers a lower end face of the salient pole tip end part 24*c* and outer peripheral sides of a lower end side portion of the salient pole tip end part 24*c*.

The outer side flange part 30*c* is formed in a flange shape which is enlarged from an outer side end of the half tube part 30*a* in the radial direction to both sides in the circumferential direction and to a lower side, and the outer side flange part 30*c* covers a lower end face of a part of the outer peripheral part 24*e* (in other words, a part of the outer peripheral ring part 24*a* in the circumferential direction) and an inner peripheral side of a lower end side portion of a part of the outer peripheral part 24*e*. Further, as shown in FIGS. 4 and 5B, a cover part 30*d* which covers the protruded part 24*f* from a lower side and covers a lower end side portion of the protruded part 24*f* from the salient pole part 24*b* side (in other words, covers from an inner side of the outer peripheral part 24*e* in the circumferential direction) is formed on both end sides of the outer side flange part 30*c* in the circumferential direction.

The second insulator 31 is, as shown in FIG. 4, structured of a half tube part 31*a* in a rectangular groove shape which covers side faces of an upper end side portion of the connecting part 24*d* and an upper face of the connecting part 24*d*, an inner side flange part 31*b* connected with an inner side end in the radial direction of the half tube part 31*a*, and an outer side flange part 31*c* connected with an outer side end in the radial direction of the half tube part 31*a*. The inner side flange part 31*b* is formed in a flange shape which is enlarged from an inner side end in the radial direction of the half tube part 31*a* toward both sides in the circumferential direction and toward an upper side, and the inner side flange part 31*b* covers an outer peripheral side of an upper end side portion of the salient pole tip end part 24*c*.

The outer side flange part 31*c* is formed in a flange shape which is enlarged from an outer side end in the radial direction of the half tube part 31*a* toward both sides in the circumferential direction and toward an upper side, and the outer side flange part 31*c* covers an upper end face of a part of the outer peripheral part 24*e* (in other words, a part in the circumferential direction of the outer peripheral ring part 24*a*) and an inner peripheral side of an upper end side portion of a part of the outer peripheral part 24*e*. Further, as shown in FIGS. 4 and 5B, a cover part 31*d* which covers the protruded part 24*f* from an upper side and covers an upper end side portion of the protruded part 24*f* from the salient pole part 24*b* side (in other words, covers from an inner side of the outer peripheral part 24*e* in the circumferential direction) is formed on both end sides of the outer side flange part 31*c* in the circumferential direction.

At least an upper end side portion and a lower end side portion of the protruded part 24*f* are covered by the cover part 30*d* and the cover part 31*d* from the salient pole part 24*b* side. The cover parts 30*d* and 31*d* function to prevent a conducting wire structuring the drive coil 23 from contacting with the protruded part 24*f* when the drive coil 23 is wound through the insulator 25. Therefore, according to this embodiment, damage of a coating film of a conducting wire due to contact of the conducting wire structuring the drive coil 23 with the protruded part 24*f* can be prevented.

An upper end side portion of the terminal pin 26 is press-fitted and fixed to the first insulator 30. In other words, the terminal pin 26 is fixed to the first insulator 30 so as to protrude from a lower end face of the first insulator 30. Further, two terminal pins 26 are fixed to one first insulator 30.

The drive coil 23 is structured of a conducting wire made of an aluminum alloy or an copper alloy. The drive coil 23 is wound around the salient pole part 24*b* through the insulator 25. Specifically, the drive coil 23 is wound around the connecting part 24*d* through the half tube parts 30*a* and 31*a*. One end part of the drive coil 23 is bound and fixed to one of the two terminal pins 26 fixed to the first insulator 30, and the other end part of the drive coil 23 is bound and fixed to the other of the two terminal pins 26.

(Manufacturing Method for Stator)

Figure 6:
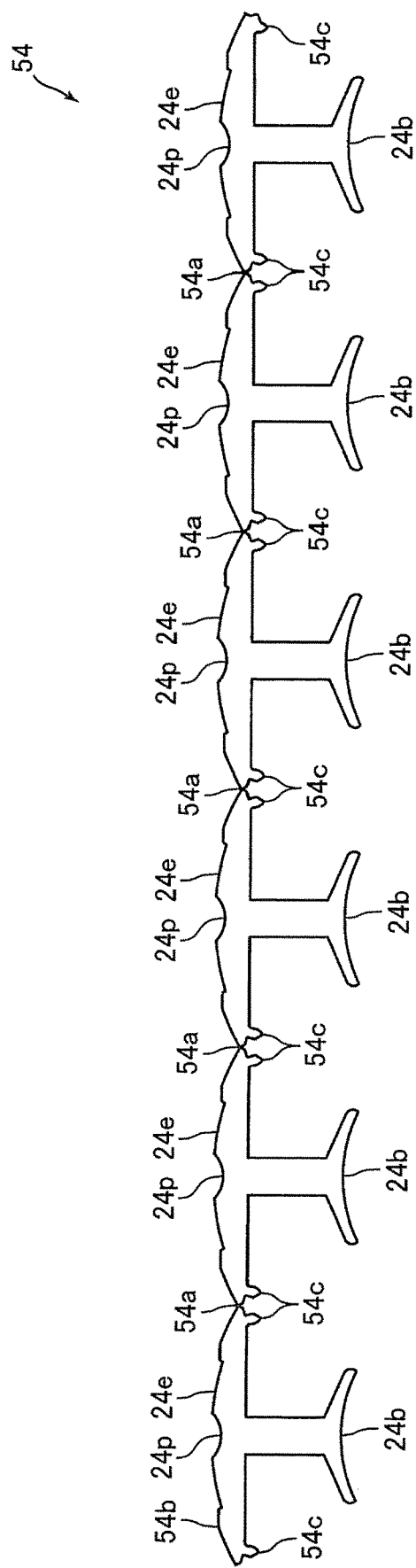
FIG. 6 is a plan view showing an original core body which becomes a stator core shown FIG. 3 after being processed.
Figure 7A:
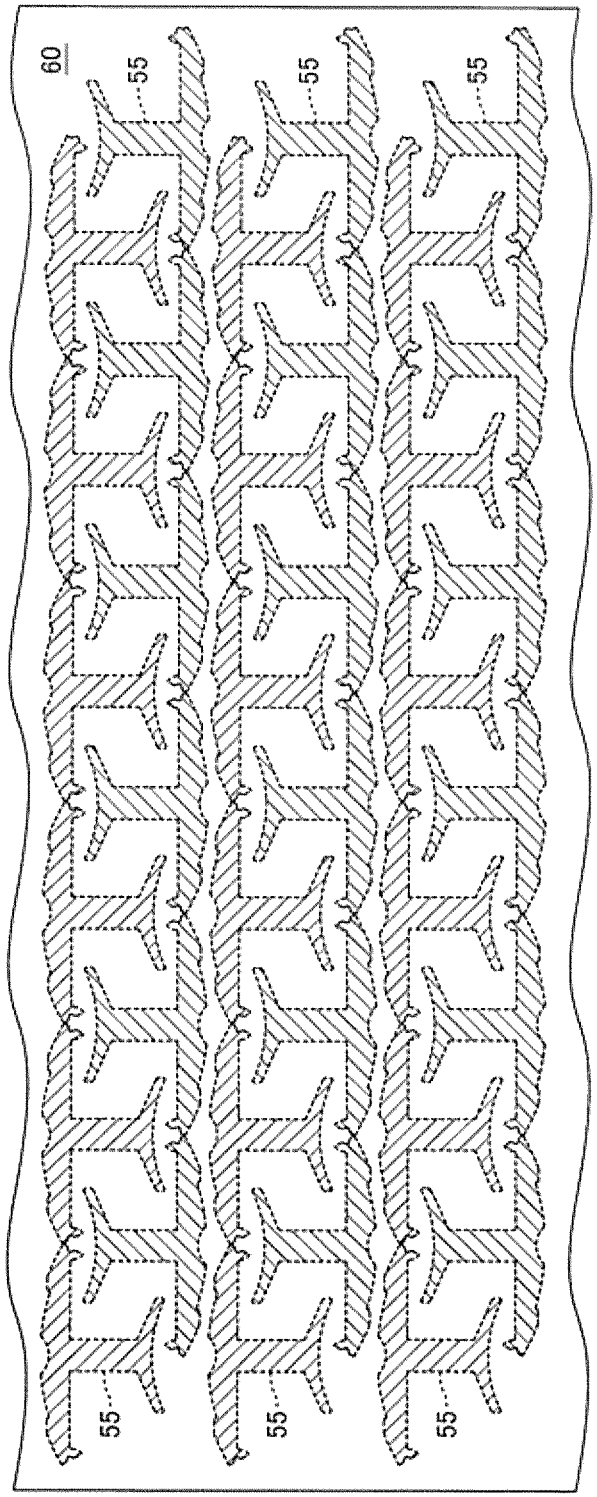
FIG. 7A is an explanatory view showing a manufacturing method for a core plate which structures an original core body shown in FIG. 6.
Figure 7B:
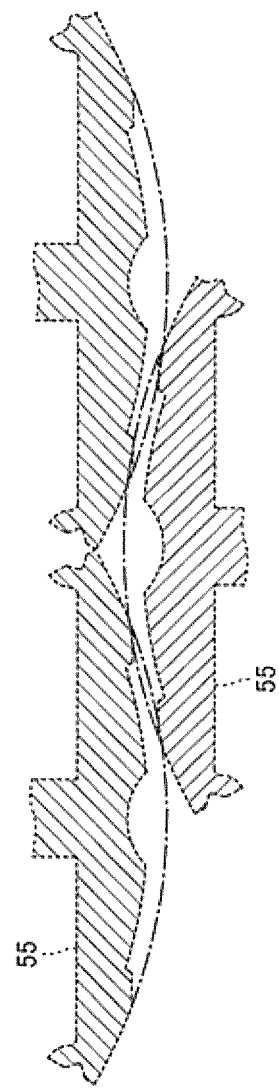
FIG. 7B is an enlarged view showing a part of a material plate shown in FIG. 7A.
Figure 8A:
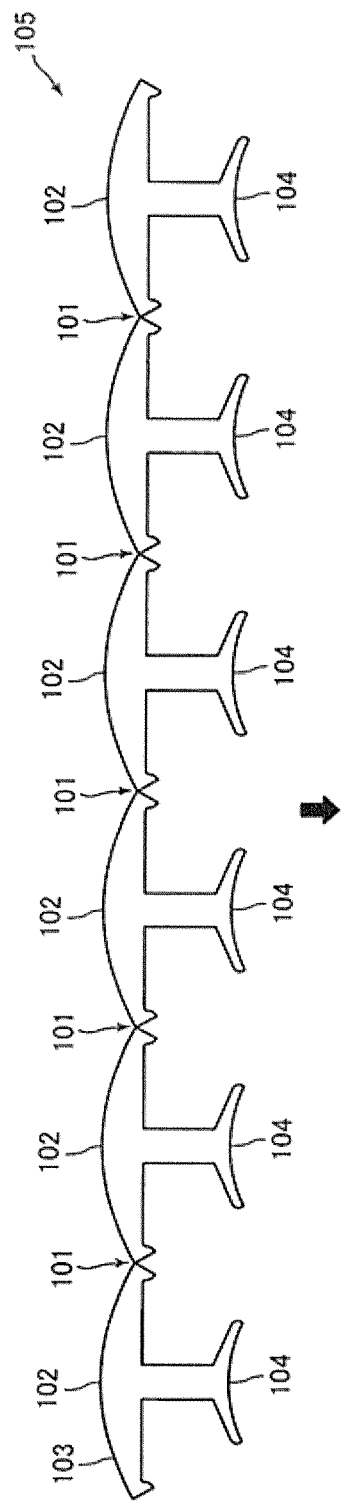
FIG. 8A and FIG. 8B are explanatory views showing a structure of a stator core in a prior art.
Figure 8B:
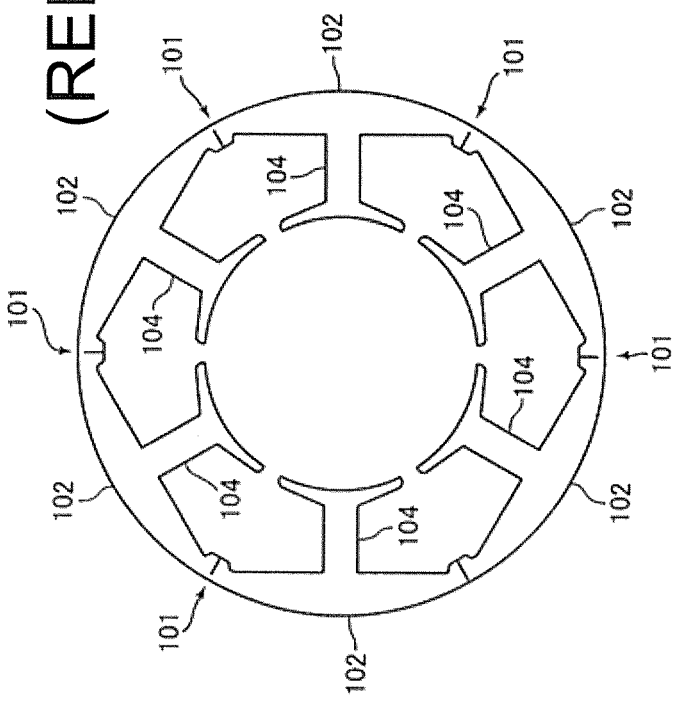

FIG. 6 is a plan view showing an original core body 54 which becomes the stator core 24 shown in FIG. 3 after being processed. FIG. 7A is an explanatory view showing a manufacturing method for a core plate 55 which structures the original core body 54 shown in FIG. 6, and FIG. 7B is an enlarged view showing a part of a material plate 60 shown in FIG. 7A.

The stator 6 is manufactured as described below. First, an original core body 54 (see FIG. 6) which becomes the stator core 24 after being processed is manufactured. An original core body 54*b* is, as shown in FIG. 6, provided with a belt-shaped part 54*b* in a straight line shape, which is structured of six outer peripheral parts 24*e* connected with each other through bending parts 54*a*, and six salient pole parts 24*b* each of which is protruded from each of the six outer peripheral parts 24*e* in a direction perpendicular to a longitudinal direction of the belt-shaped part 54*b*. The stator core 24 is a laminated core as described above. The core plate 55 has the same shape as the original core body 54 when viewed in a thickness direction and the original core body 54 is formed of the core plates 55 in a thin plate shape which are laminated and fixed to each other. In this embodiment, protruded parts 54*c* which become the protruded part 24*f* after being processed are formed at both ends of the belt-shaped part 54*b* and in the vicinities of the bending parts 54*a*.

In order to manufacture the original core body 54, first, portions hatched with oblique lines in FIG. 7A are punched through a punching work by a press from a material plate 60 in a thin plate shape made of magnetic material to form a plurality of core plates 55. A die which is used in the press work is formed so that portions of core plates 55 to be punched which become belt-shaped parts 54*b* are adjacently disposed to each other, and that portions which become salient pole parts 24*b* of one core plate 55 are disposed between salient pole parts 24*b* of another core plate 55. Further, a plurality of core plates 55 formed by punching the material plate 60 is laminated and fixed to each other to manufacture the original core body 54.

After that, the insulators 25 are attached to the original core body 54. Further, the terminal pins 26 are press-fitted and fixed to the first insulator 30. After that, the drive coil 23 is wound around the salient pole part 24*b* through the insulator 25 and the drive coil 23 is soldered and fixed to the terminal pin 26. When the drive coil 23 is to be wound around the salient pole part 24*b* through the insulator 25, contacting of a conducting wire structuring the drive coil 23 with the protruded part 24*f* of the stator core 24 is prevented by the cover parts 30*d* and 31*d* of the insulator 25.

After that, the belt-shaped part 54*b* is successively bent at the bending parts 54*a* so that the belt-shaped part 54*b* in a straight line shape becomes the outer peripheral ring part 24*a* in a ring shape and that the salient pole parts 24*b* are protruded to an inner side of the outer peripheral ring part 24*a* in a radial direction. When the belt-shaped part 54*b* is to be bent, a bending jig (not shown) is pressed against the recessed parts 24*p* to bend the belt-shaped part 54*b*. After that, the end parts of the belt-shaped part 54*b* are connected with each other by welding or the like. When the end parts of the belt-shaped part 54*b* are connected with each other, the stator 6 is completed. In this embodiment, when the stator 6 is completed, the cylindrical tube part 11*b* of the partition member 11 is inserted to an inner peripheral side of the stator 6. After that, the circuit board 4 is fixed to the partition member 11 and the terminal pins 26 are soldered and fixed to the circuit board 4. Further, after that, the resin sealing member 12 is formed so as to cover the stator 6 and the circuit board 4.

(Principal Effects in this Embodiment)

As described above, in the stator core 24 in this embodiment, an outer diameter of a portion between the two curved face parts 24*h* in a circumferential direction of one outer peripheral face 24*g* is set to be smaller than the outer diameter "D" of the curved face part 24*h*. Therefore, according to this embodiment, in a die for forming a plurality of the core plates 55 from one material plate 60, a distance between portions of the core plates 55 to be punched which become the belt-shaped parts 54*b* can be made smaller. In other words, in a case that the entire one outer peripheral face 24*g* is formed in one curved face shape whose curvature radius is equal to that of the curved face part 24*h*, for example, a portion as shown by the alternate long and short dash line in FIG. 7B is interfered with a part of its adjacent core plate 55. Therefore, in a die for forming the core plate 55, portions of the core plates 55 to be punched which become the belt-shaped parts 54*b* cannot be brought close to each other. However, in this embodiment, portions of the core plates 55 to be punched which become the belt-shaped parts 54*b* can be brought close to each other.

Therefore, according to this embodiment, in comparison with a case that the entire one outer peripheral face 24*g* is formed in one curved face shape, when a plurality of core plates 55 is to be formed by using a material plate 60, many core plates 55 can be formed from one material plate 60. In other words, in this embodiment, the number of the core plates 55 to be obtained from one material plate 60 can be increased. Therefore, according to this embodiment, a manufacturing cost of the stator core 24 which is a curling core can be reduced.

In this embodiment, the curved face part 24*h* is formed in a convex curved face shape which is a circular arc shape with an axial center of the stator 6 as the curvature center "C1". In other words, in this embodiment, a part of the outer peripheral face of the outer peripheral ring part 24*a* is formed in the curved face part 24*h* in a convex curved face shape with the axial center of the stator 6 as the curvature center "C1". Therefore, according to this embodiment, while reducing an outer diameter of the stator core 24, a cross-sectional area of the outer peripheral ring part 24*a* can be secured. Accordingly, in this embodiment, while reducing the outer diameter of the stator core 24, magnetic saturation in the outer peripheral ring part 24*a* can be suppressed.

Further, in this embodiment, the second curved face parts 24*j* in a convex curved face shape whose shape when viewed in the upper and lower direction is a circular arc shape are formed between the two curved face parts 24*h* in the circumferential direction of one outer peripheral face 24*g*. Therefore, according to this embodiment, even when the recessed part 24*p* is formed between the two curved face parts 24*h* in the circumferential direction, in comparison with a case that the two curved face parts 24*h* are connected with each other by a flat face part in a flat face shape, a cross-sectional area of the outer peripheral ring part 24a in a center portion of the outer peripheral part 24e in the circumferential direction can be secured. Accordingly, in this embodiment, magnetic saturation in the outer peripheral ring part 24a can be suppressed effectively.

Further, in the present invention, the outer diameter of the portion between the two curved face parts 24h in the circumferential direction of one outer peripheral face 24g is longer in the circumferential direction than a length in the circumferential direction which is obtained by adding the two curved face parts 24h. Therefore, according to this embodiment, in a die for forming a plurality of the core plates 55 from one material plate 60, a distance between portions of the core plates 55 to be punched which become the belt-shaped parts 54b can be further reduced.

Other Embodiments

Although the present invention has been shown and described with reference to a specific embodiment, various changes and modifications will be apparent to those skilled in the art from the teachings herein.

In the embodiment described above, the stator core 24 is a laminated core. However, the stator core 24 may be a core other than a laminated core. Even in this case, the number of the original core bodies 54 to be obtained from one material plate can be increased and thus a manufacturing cost of the stator core 24 which is a curling core can be reduced. Further, in the embodiment described above, the curvature center "C1" of the curved face part 24h when viewed in the upper and lower direction is coincided with the axial center of the stator 6. However, the curvature center "C1" may be displaced from the axial center of the stator 6. In addition, in the embodiment described above, the recessed part 24p is formed in the outer peripheral part 24e. However, no recessed part 24p may be formed in the outer peripheral part 24e.

In the embodiment described above, the curved face part 24h and the second curved face part 24j are connected with each other through the two flat face parts 24k and 24n. However, the curved face part 24h and the second curved face part 24j may be connected with each other through one flat face part formed in a flat face shape. Further, in the embodiment described above, one second curved face part 24j is formed between the two curved face parts 24h in the circumferential direction of one outer peripheral face 24g. However, in addition to the second curved face part 24j, one or more curved face parts which is different from the second curved face part 24j may be formed between the two curved face parts 24h of one outer peripheral face 24g in the circumferential direction. In addition, in the embodiment described above, the second curved face part 24j is formed between the two curved face part 24h in the circumferential direction of one outer peripheral face 24g. However, it may be structured that the two curved face parts 24h are connected with each other through one flat face part formed in a flat face shape.

In the embodiment described above, each of the six first insulators 30 and the six second insulators 31 is attached to each of the six salient pole parts 24b, and the first insulator 30 and the second insulator 31 are divided for every salient pole part 24b. However, the first insulator 30 and the second insulator 31 are not required to be divided for every salient pole part 24b. For example, it may be structured that the six first insulators 30 are integrally formed each other and the six second insulators 31 are integrally formed each other.

Further, in the embodiment described above, the motor 3 is used in a pump device 1. However, the motor 3 may be used in a device other than a pump device 1. Further, in the embodiment described above, the stator 6 is used in a motor 3. However, the stator 6 may be used in an electric power generator.

REFERENCE SIGNS LIST 1 pump device
2 impeller
3 motor
5 rotor
6 stator
9 pump chamber
11 partition member
12 resin sealing member
14 drive magnet
23 drive coil (coil)
24 stator core
24a outer peripheral ring part
24b salient pole part
24e outer peripheral part
24g outer peripheral face
24h curved face part
24j second curved face part
24k flat face part
24p recessed part
25 insulator (insulation member)
"C1" curvature center
"D" outer diameter of curved face part

The invention claimed is:

1. A stator formed in a tube shape, the stator comprising:
a coil;
an insulation member; and
a stator core comprising a plurality of salient pole parts, the coil being wound around each of the plurality of the salient pole parts through the insulation member;
wherein the stator core comprises:
an outer peripheral ring part which is formed in a ring shape; and
the plurality of the salient pole parts which are protruded from the outer peripheral ring part to an inner side in a radial direction of the stator and are disposed at regular intervals in a circumferential direction of the stator;
wherein the outer peripheral ring part is structured of a same number of the outer peripheral parts as a number of the plurality of the salient pole parts;
wherein each of a plurality of the outer peripheral parts is connected with one of the salient pole parts;
wherein when an outer side face of the outer peripheral part in the radial direction is referred to as an outer peripheral face, both end side portions in the circumferential direction of the outer peripheral face of one of the outer peripheral parts are respectively formed to be a curved face part in a convex curved face shape which is a circular arc shape, curvature radii of the circular arc shapes are equal to each other and their curvature centers are common when viewed in an axial direction of the stator; and
wherein an outer diameter of a portion between two of the curved face parts in the circumferential direction of the outer peripheral face of one of the outer peripheral parts is set to be smaller than an outer diameter of the curved face part, wherein the outer peripheral face of one of the outer peripheral parts is formed with a second curved face part in a convex curved face shape, which is a circular arc shape when viewed in the axial direction, between two of the curved face parts in the circumferential direction; and the salient pole part is formed at a center of the outer peripheral part in the circumferential direction.

2. The stator according to claim 1, wherein
when viewed in the axial direction, the curvature center of the curved face part is coincided with an axial center of the stator.

3. The stator according to claim 1, wherein
the outer peripheral face of one of the outer peripheral parts is formed with a flat face part in a flat face shape, which is a straight line shape when viewed in the axial direction, between the curved face part and the second curved face part in the circumferential direction.

4. The stator according to claim 1, wherein
the second curved face part is formed with a recessed part which is recessed to an inner side in the radial direction,
the recessed part is formed over an entire region in the axial direction of the second curved face part and is formed in a circular arc shape when viewed in the axial direction, and
the salient pole part and the recessed part are disposed so as to overlap in the radial direction.

5. The stator according to claim 1, wherein
the outer peripheral face of one of the outer peripheral parts is formed between the curved face part and the second curved face part in the circumferential direction with:
  a first flat face part in a flat face shape which is a straight line shape when viewed in the axial direction and is connected with the curved face part; and
  a second flat face part in a flat face shape which is a straight line shape when viewed in the axial direction and is connected with the first flat face part and the second curved face part.

6. The stator according to claim 1, wherein
a boundary portion of the outer peripheral parts adjacent to each other in the circumferential direction is formed with a protruded part protruding to an inner side in the radial direction in an inner peripheral face of the outer peripheral ring part.

7. The stator according to claim 1, wherein
a portion between two of the curved face parts in the circumferential direction of the outer peripheral face of one of the outer peripheral parts is longer in the circumferential direction than a length obtained by adding two of the curved face parts in the circumferential direction.

8. The stator according to claim 1, wherein
a curvature center of the second curved face part is coincided with a curvature center of the curved face part, and
a curvature radius of the second curved face part is set to be smaller than a curvature radius of the curved face part.

9. A motor comprising:
the stator defined in claim 1; and
a rotor which comprises a drive magnet and is disposed on an inner peripheral side with respect to the stator.

10. A pump device comprising:
the motor defined in claim 9;
an impeller which is attached to the rotor;
a pump chamber in which the impeller and the rotor are disposed and through which a fluid is passed;
a partition member which is disposed between the stator and the pump chamber and which prevents an inflow of the fluid in the pump chamber into an arrangement portion of the stator; and
a resin sealing member made of resin which covers the stator.

11. The stator according to claim 5, wherein
when viewed in the axial direction, the curvature center of the curved face part is coincided with an axial center of the stator.

12. The stator according to claim 5, wherein
a boundary portion of the outer peripheral parts adjacent to each other in the circumferential direction is formed with a protruded part protruding to an inner side in the radial direction in an inner peripheral face of the outer peripheral ring part.

13. The stator according to claim 8, wherein
when viewed in the axial direction, the curvature center of the curved face part is coincided with an axial center of the stator.

14. The stator according to claim 8, wherein
the outer peripheral face of one of the outer peripheral parts is formed with a flat face part in a flat face shape, which is a straight line shape when viewed in the axial direction, between the curved face part and the second curved face part in the circumferential direction.

15. The stator according to claim 8, wherein
a portion between two of the curved face parts in the circumferential direction of the outer peripheral face of one of the outer peripheral parts is longer in the circumferential direction than a length obtained by adding two of the curved face parts in the circumferential direction.

16. The stator according to claim 1, wherein
the outer peripheral face of one of the outer peripheral parts is formed with a second curved face part in a convex curved face shape, which is a circular arc shape when viewed in the axial direction, between two of the curved face parts in the circumferential direction, and
an outer diameter of the second curved face part is set to be smaller than an outer diameter of the curved face part.

17. The stator according to claim 16, wherein
when viewed in the axial direction, the curvature center of the curved face part is coincided with an axial center of the stator.

18. The stator according to claim 17, wherein
the outer peripheral face of one of the outer peripheral parts is formed with a flat face part in a flat face shape, which is a straight line shape when viewed in the axial direction, between the curved face part and the second curved face part in the circumferential direction.

19. The stator according to claim 17, wherein
a portion between two of the curved face parts in the circumferential direction of the outer peripheral face of one of the outer peripheral parts is longer in the circumferential direction than a length obtained by adding two of the curved face parts in the circumferential direction.

* * * * *